United States Patent
Wu

(10) Patent No.: US 8,723,981 B2
(45) Date of Patent: May 13, 2014

(54) FLICKER DETECTING APPARATUS AND METHOD FOR CAMERA MODULE

(75) Inventor: Chiung-Sheng Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/569,193

(22) Filed: Aug. 8, 2012

(65) Prior Publication Data

US 2013/0222637 A1  Aug. 29, 2013

(30) Foreign Application Priority Data

Feb. 24, 2012  (TW) .............................. 101106434 A

(51) Int. Cl.
*H04N 9/73* (2006.01)

(52) U.S. Cl.
USPC ..................................... 348/226.1; 348/228.1

(58) Field of Classification Search
USPC ........ 348/222.1, 226.1–228.1, 241, 250–251, 348/254
See application file for complete search history.

(56) References Cited

U.S. PATENT DOCUMENTS

| 2001/0052935 A1* | 12/2001 | Yano | 348/207 |
| 2002/0158971 A1* | 10/2002 | Daiku et al. | 348/226.1 |
| 2007/0046790 A1* | 3/2007 | Nakasuji et al. | 348/226.1 |
| 2009/0147103 A1* | 6/2009 | Chao | 348/226.1 |
| 2010/0253848 A1* | 10/2010 | Nagajjanavar | 348/584 |
| 2011/0050951 A1* | 3/2011 | Morino | 348/226.1 |

* cited by examiner

*Primary Examiner* — Kelly L Jerabek
(74) *Attorney, Agent, or Firm* — Novak Druce Connolly Bove + Quigg LLP

(57) ABSTRACT

A flicker detecting apparatus for a camera module includes a processor. The processor includes a brightness values reading module, a calculating module, and a determining module. The brightness values reading module reads out a number of brightness values from a number of pixels of pictures captured by the camera module. The calculating module calculates out brightness values differences between the pixels. The determining module compares the brightness values differences with a preset value to determine whether the camera module is acceptable.

9 Claims, 5 Drawing Sheets

FLICKER DETECTING APPARATUS AND METHOD FOR CAMERA MODULE

BACKGROUND

1. Technical Field

The present disclosure relates to a flicker detecting apparatus for a camera module and a flicker detecting method for the camera module.

2. Description of the Related Art

Developments in micro-circuitry and multimedia technology have led to camera modules being frequently deployed in portable electronic devices such as mobile phones and personal digital assistants. To facilitate portability, such camera modules not only tend to be compact, slim, and light, but also need to meet the requirements for good image quality. As a result, testing of camera modules before shipment is very important. However, such testing is typically carried out manually. For example, an image is captured using the camera module and transmitted to a computer for display. The image is then examined by an operator to determine whether the detected camera module has flicker or not. However, the manual test is time-consuming and inefficient.

Therefore, it is desirable to provide an apparatus for a camera module and a method which can overcome the limitations described.

BRIEF DESCRIPTION OF THE DRAWINGS

Many aspects of the present disclosure could be better understood with reference to the accompanying drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the present camera module will be now described in detail with reference to the drawings.

Figure 1:
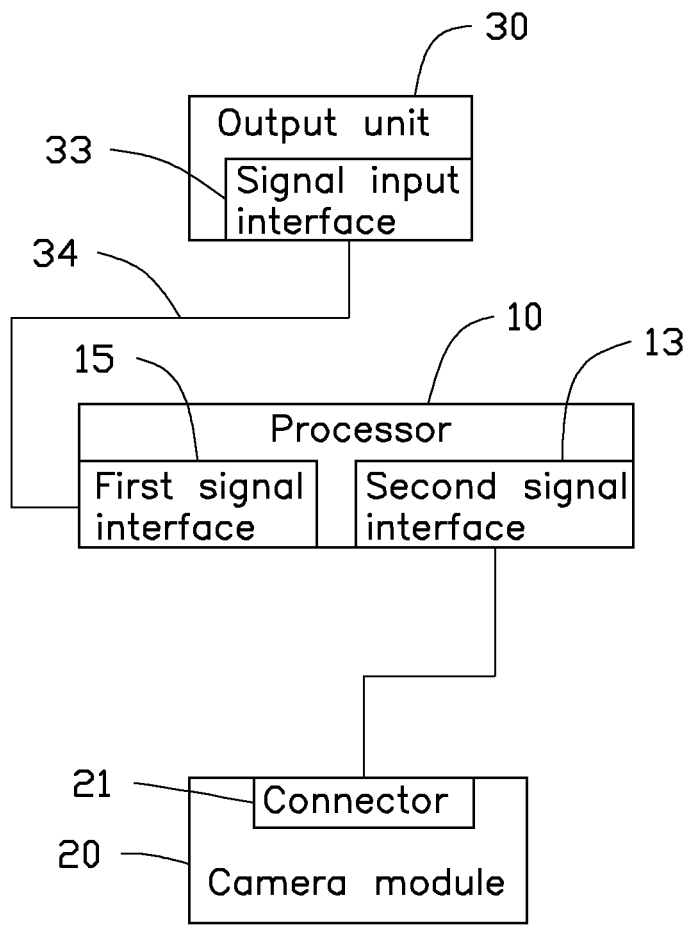
FIG. 1 is a schematic view of a flicker detecting apparatus which includes a processor, according to a first exemplary embodiment.
Figure 2:
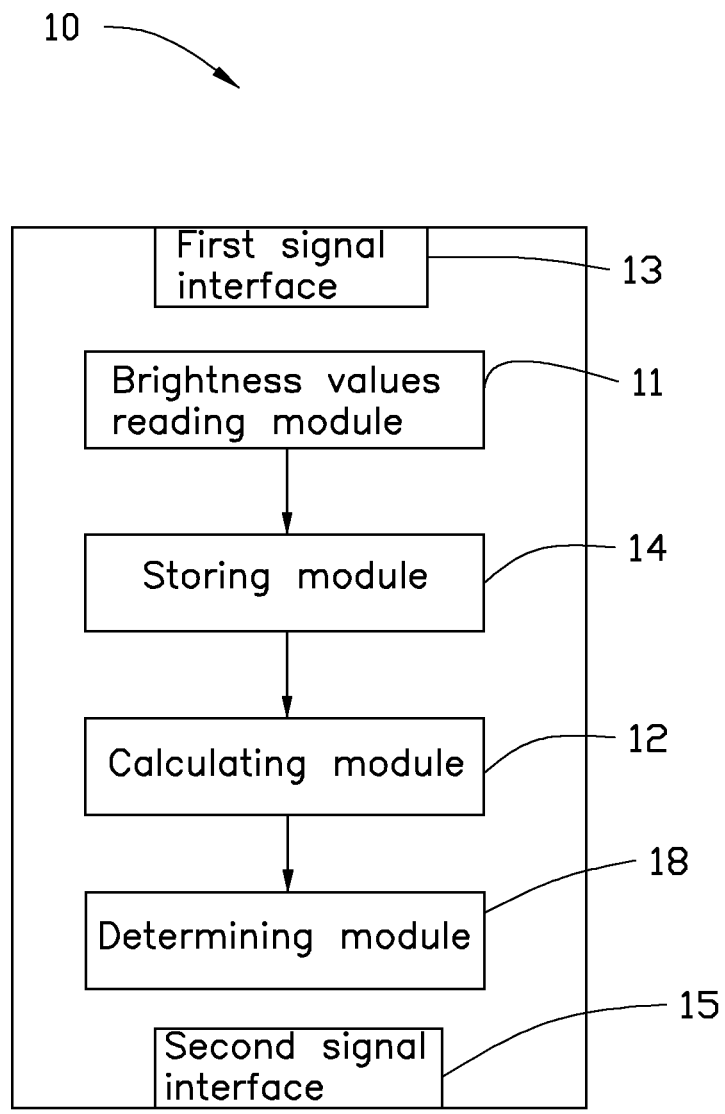
FIG. 2 is a functional block diagram of the processor of FIG. 1.

Referring to FIGS. 1-2, a flicker detecting apparatus 100 according to a first exemplary embodiment is shown. The flicker detecting apparatus 100 is for detecting whether a camera module 20 has flickers or not. The flicker detecting apparatus 100 includes a processor 10 and an output unit 30.

The processor 10 includes a brightness values reading module 11, a calculating module 12, and a determining module 18. The brightness values reading module 11 is configured for reading out a number of brightness values from a number of pixels of images captured by the detected camera module 20. The calculating module 12 is configured for calculating out brightness values differences between the pixels. The determining module 18 is configured for comparing the brightness values differences with a preset value to determine whether the camera module 20 is acceptable. Thus the flicker detecting apparatus 100 is capable of detecting whether the detected camera module 20 has flicker or not. The output unit 30 is configured for outputting the result of the quality of the images to determine the quality of the camera module 100.

The processor 10 can be a microcontroller or a programmable intelligent device. The processor 10 also includes a first signal interface 13, a second signal interface 15 and a storing module 14. Various components of the first signal interface 13, the second signal interface 15, the storing module 14, the brightness values reading module 11, the determining module 18, and the calculating module 12 can be individual electrical elements, or alternatively integrated into the processor 10. The components can connect to each other by an input/output (I/O) bus to allow required communication therebetween. Also, some components can be software modules written in a variety of computer languages such as C#, Visual C++, Visual Basic, and C++, and executed on hardware to realize corresponding functions.

In the embodiment, both the first and second signal interfaces 13 and 15 are two Universal Serial Bus (USB) ports. The brightness values reading module 11 reads out the brightness values from the pixels of the images captured by the detected camera module 20 through the first signal interface 13 connecting to a connector 21 of the camera module 20. The storing module 14 is configured for storing the brightness values read by the brightness values reading module 11. As such, the calculating module 12 reads the brightness values from the storing module 14. It should be noted that the processor 10 also can omit the storing module 14, the calculating module 12 directly reads the brightness values from the brightness values reading module 11.

The output unit 30 can be a display and includes a signal inputting interface 33. The signal inputting interface 33 of the output unit 30 is electrically coupled to the second signal interface 15 of the processor 10 through a signal connection line 34.

Figure 3:
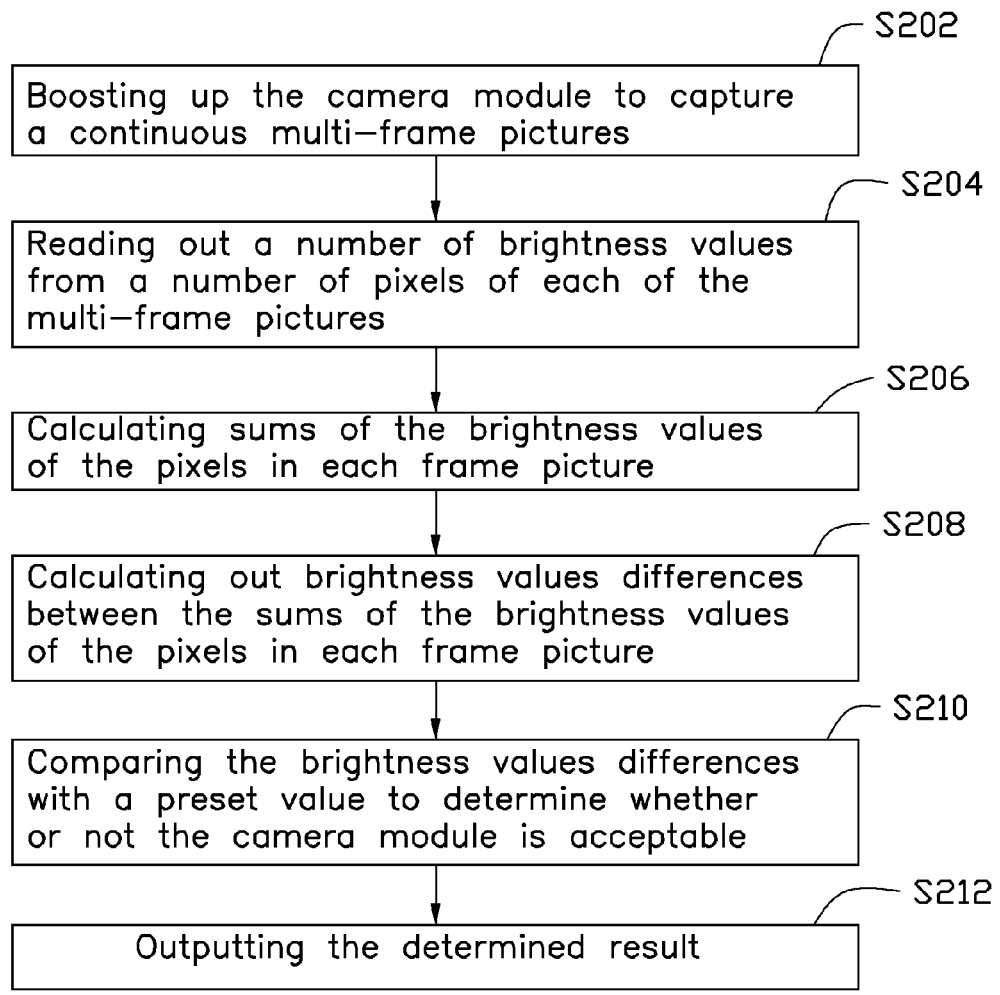
FIG. 3 is a flowchart of a flicker detecting method for camera modules, according to a second exemplary embodiment.

FIG. 3 is a flowchart of a method for detecting the camera module 100, according to a second embodiment, as follows.

In step 202, connecting the connector 21 of the camera module 20 to the first signal interface 13 of the processor 10, and boosting up the camera module 20 to capture a continuous multi-frame pictures.

In step 204, reading out a number of brightness values from a number of pixels of each of the multi-frame pictures by using the brightness values reading module 11.

In step 206, calculating sums of the brightness values of the pixels in each frame picture by using the calculating module 12, such as Sum [frame (i), frame (i+1), frame (i+2)].

In step 208, calculating out brightness values differences between the sums of the brightness values of the pixels in each frame picture by using the calculating module 12.

In step 210, comparing the brightness values differences with a preset value by using the determining module 18 to determine whether or not the camera module 20 is acceptable. If the differences do not exceed a preset value, the camera module 20 is considered acceptable, and otherwise the pictures captured by the camera module 20 have flickers and the camera module 20 is considered unacceptable. In particular, the calculating module 12 calculates out brightness values differences, such as Sum [frame (i+1)]−Sum [frame (i)] and Sum [frame (i+2)]−Sum [frame (i+1)], if the differences do not exceed the preset value H, the camera module 20 is considered acceptable, in the embodiment, $0 \leq H \leq 1$.

In step 212, outputting the determined result to the output unit 30.

Figure 4:
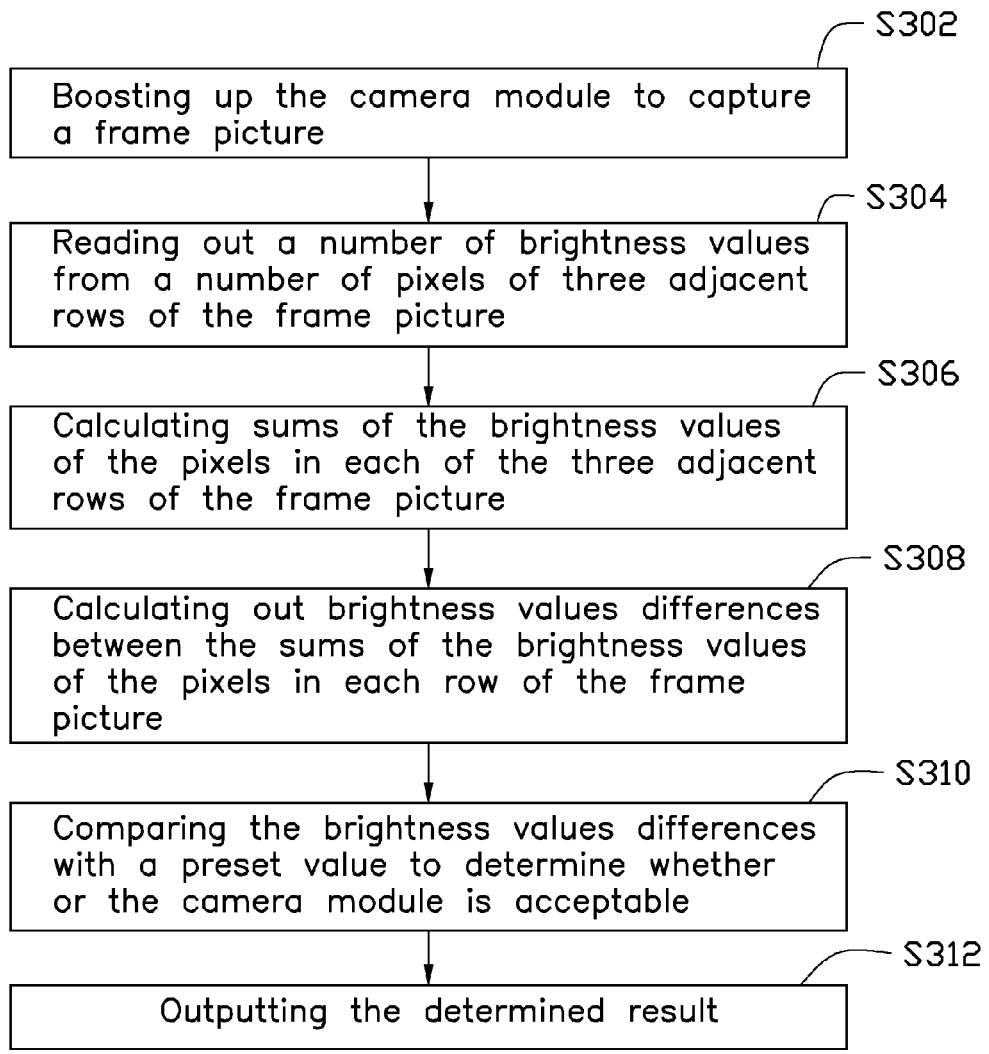
FIG. 4 is a flowchart of a flicker detecting method for camera modules, according to a third exemplary embodiment.

FIG. 4 is a flowchart of a method for detecting the camera module 100, according a third embodiment, as follows.

In step 302, connecting the connector 21 of the camera module 20 to the first signal interface 13 of the processor 10, and boosting up the camera module 20 to capture a frame picture.

In step 304, reading out a number of brightness values from a number of pixels of three adjacent rows of the frame picture by using the brightness values reading module 11.

In step 306, calculating sums of the brightness values of the pixels in each of the three adjacent rows of the frame picture by using the calculating module 12, such as Sum [row (i), row (i+1), row (i+2)].

In step 308, calculating out brightness values differences between the sums of the brightness values of the pixels in each row of the frame picture by using the calculating module 12.

In step 310, comparing the brightness values differences with a preset value by the determining module 18 to determine whether or the camera module 20 is acceptable. If the differences do not exceed a preset value, the camera module 20 is considered acceptable, and otherwise the picture captured by the camera module 20 has flickers and the camera module 20 is considered unacceptable. In particular, the calculating module 12 calculates out brightness values differences, such as Sum [row (i+1)]−Sum [row (i)] and Sum [row (i+2)]−Sum [row (i+1)], if the differences do not exceed the preset value H, the camera module 20 is considered acceptable, in the embodiment, $0 \leq H \leq 1$.

In step 312, outputting the determined result to the output unit 30.

Figure 5:
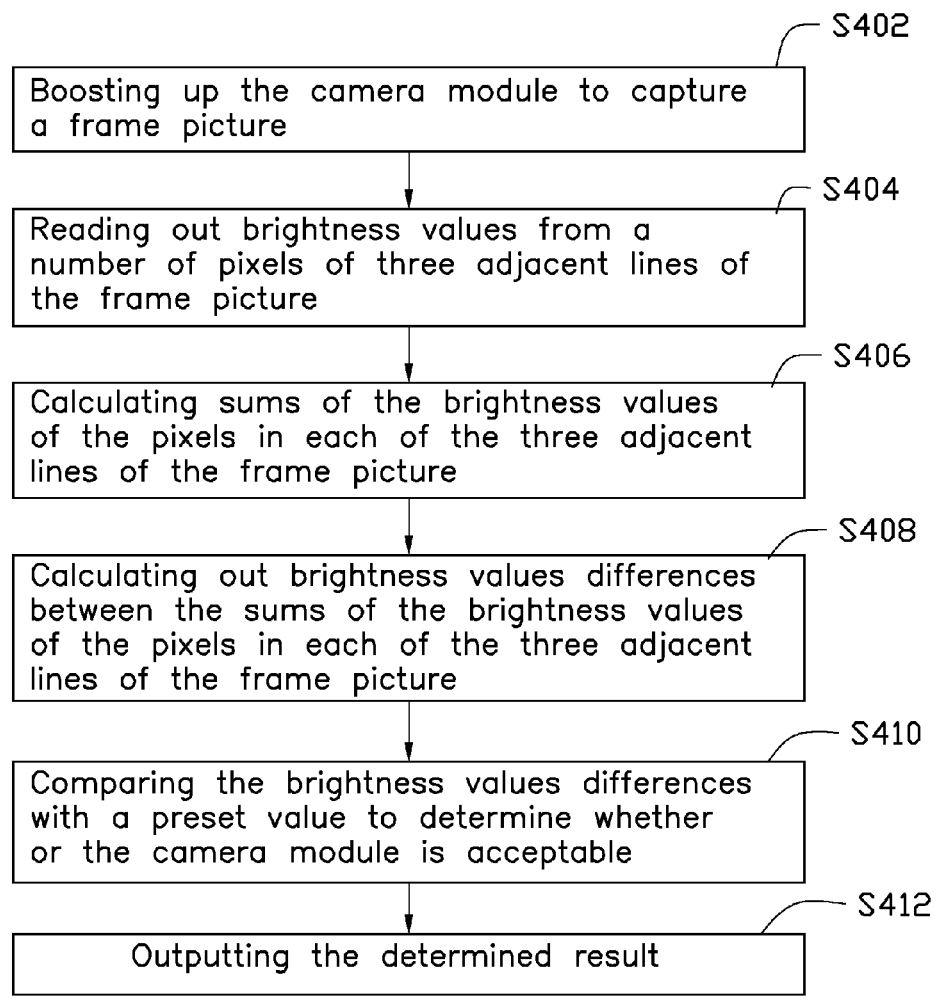
FIG. 5 is a flowchart of a flicker detecting method for camera modules, according to a fourth exemplary embodiment.

FIG. 5 is a flowchart of a method for detecting the camera module 100, according a fourth embodiment, as follows.

In step 402, connecting the connector 21 of the camera module 20 to the first signal interface 13 of the processor 10, and boosting up the camera module 20 to capture a frame picture.

In step 404, reading out brightness values from a number of pixels of three adjacent lines of the frame picture by using the brightness values reading module 11.

In step 406, calculating sums of the brightness values of the pixels in each of the three adjacent lines of the frame picture, such as Sum [line (i), line (i+1), line (i+2)].

In step 408, calculating out brightness values differences between the sums of the brightness values of the pixels in each of the three adjacent lines of the frame picture.

In step 410, comparing the brightness values differences with a preset value by the determining module 18 to determine whether or not the camera module 20 is acceptable. If the differences do not exceed a preset value, the camera module 20 is considered acceptable, and otherwise the picture captured by the camera module 20 has flickers and the camera module 20 is considered unacceptable. In particular, the calculating module 12 calculates out brightness values differences, such as Sum [line (i+1)]−line [row (i)] and Sum [line (i+2)]−Sum [line (i+1)], if the differences do not exceed the preset value H, the camera module 20 is considered acceptable, in the embodiment, $0 \leq H \leq 1$.

In step 412, outputting the determined result to the output unit 30.

The flicker detecting apparatus 100 provides quality testing by analyzing a captured image with no operator determination or visual inspection required, improving the efficiency of testing.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A flicker detecting apparatus for a camera module, comprising:
    a processor comprising:
        a brightness values reading module configured for reading out a plurality of brightness values from a plurality of pixels of three adjacent lines of a frame picture captured by the camera module;
        a calculating module in communication with the brightness values reading module and configured for calculating out sums of the brightness values of the pixels in each of the three adjacent lines, and calculating out brightness values differences between the sums of the brightness values of the pixels in each of the three adjacent lines of the frame picture; and
        a determining module in communication with the calculating module and configured for comparing the brightness values differences between the sums of the brightness values with a preset value H to determine whether the camera module is acceptable; and
    an output unit in communication with the processor and configured for outputting a determined result from the processor.

2. The flicker detecting apparatus of claim 1, wherein the processor further comprises a storing unit, the storing module is configured for storing the brightness values read by the brightness values reading module, and the calculating module reads the brightness values from the storing module.

3. The flicker detecting apparatus of claim 1, wherein the processor further comprises a first signal interface, the brightness values reading module reads out the brightness values from the pixels of the pictures captured by the camera module through the first signal interface.

4. The flicker detecting apparatus of claim 3, wherein the processor further comprises a second signal interface, the output unit is electrically coupled to the second signal interface of the processor through a signal connection line.

5. The flicker detecting apparatus of claim 4, wherein both the first and second signal interfaces are USB ports.

6. The flicker detecting apparatus of claim 1, wherein the output unit is a display.

7. The flicker detecting apparatus of claim 1, wherein $0 \leq H \leq 1$.

8. A flicker detecting method for a camera module, the method comprising:
    boosting up the camera module to capture a frame picture;
    reading out a plurality of brightness values from a plurality of pixels of three adjacent lines of the frame picture;
    calculating sums of the brightness values of the pixels in each of the three adjacent lines of the frame picture;
    calculating out brightness values differences between the sums of the brightness values of the pixels in each of the three adjacent lines of the frame picture;
    comparing the brightness values differences with a preset value H;
    determining that the camera module is acceptable upon a condition that the brightness values differences do not exceed the preset value; and
    outputting a determined result.

9. The method of claim 8, wherein $0 \leq H \leq 1$.

* * * * *